United States Patent
Liu et al.

[11] Patent Number: 5,956,469
[45] Date of Patent: Sep. 21, 1999

[54] SELECTING A CALIBRATION FUNCTION FOR A DIGITAL PRINTER WHICH MINIMIZES AN ERROR CRITERION

[75] Inventors: Hsue-Yang Liu, Rochester; Kevin E. Spaulding, Spencerport; Keith A. Hadley; Jeffrey R. Szczepanski, both of Rochester, all of N.Y.

[73] Assignee: Eastman Kodak Company, Rochester, N.Y.

[21] Appl. No.: 08/896,713

[22] Filed: Jul. 18, 1997

Related U.S. Application Data

[63] Continuation of application No. 08/602,401, Feb. 16, 1996, abandoned
[60] Provisional application No. 60/000,294, Jun. 19, 1995.

[51] Int. Cl.⁶ .................................................. H04N 1/40
[52] U.S. Cl. ............................................ 395/109; 358/406
[58] Field of Search ................................. 358/500–504, 358/400–401, 405–406; 395/109, 112–113

[56] References Cited

U.S. PATENT DOCUMENTS

| | | | |
|---|---|---|---|
| 4,335,956 | 6/1982 | Findeis et al. | 355/27 |
| 4,960,336 | 10/1990 | Brooks et al. | 400/61 |
| 5,053,866 | 10/1991 | Johnson | 358/75 |
| 5,298,993 | 3/1994 | Edgar et al. | 348/180 |
| 5,347,369 | 9/1994 | Harrington | 358/401 |
| 5,452,112 | 9/1995 | Wan et al. | 358/504 |
| 5,491,568 | 2/1996 | Wan | 358/518 |
| 5,508,826 | 4/1996 | Lloyd et al. | 358/501 |

OTHER PUBLICATIONS

R. Hodges–Dec. 29, 1995 Usenet post to comp.publish.prepress.

*Primary Examiner*—Thomas D. Lee
*Assistant Examiner*—Stephen Brinich
*Attorney, Agent, or Firm*—Raymond L. Owens

[57] ABSTRACT

A method and apparatus are disclosed for calibrating a digital printer to provide a substantially aim printer response. A test target is processed through a set of potential calibration functions to form a set of processed test targets and the set of processed test targets is printed using the digital printer. Thereafter, the set of printed test targets is measured to determine the printer response. An error criterion is determined for each measured test target by comparing the measured printer response for each of the set of potential calibration functions to the aim printer response. The calibration function which has the smallest value of the error criterion is then selected.

31 Claims, 5 Drawing Sheets

|  | x = -2 | x = -1 | x = 0 | x = 1 | x = 2 |
|---|---|---|---|---|---|
| y = 2 | R = -2.00<br>G = 2.73<br>B = -0.73 | R = -1.00<br>G = 2.23<br>B = -1.23 | R = 0.00<br>G = 1.73<br>B = -1.73 | R = 1.00<br>G = 1.23<br>B = -2.23 | R = 2.00<br>G = 0.73<br>B = -2.73 |
| y = 1 | R = -2.00<br>G = 1.87<br>B = 0.13 | R = -1.00<br>G = 1.37<br>B = -0.37 | R = 0.00<br>G = 0.87<br>B = -0.87 | R = 1.00<br>G = 0.37<br>B = -1.37 | R = 2.00<br>G = -0.13<br>B = -1.87 |
| y = 0 | R = -2.00<br>G = 1.00<br>B = 1.00 | R = -1.00<br>G = 0.50<br>B = 0.50 | R = 0.00<br>G = 0.00<br>B = 0.00 | R = 1.00<br>G = -0.50<br>B = -0.50 | R = 2.00<br>G = -1.00<br>B = -1.00 |
| y = -1 | R = -2.00<br>G = 0.13<br>B = 1.87 | R = -1.00<br>G = -0.37<br>B = 1.37 | R = 0.00<br>G = -0.87<br>B = 0.87 | R = 1.00<br>G = -1.37<br>B = 0.37 | R = 2.00<br>G = -1.87<br>B = -0.13 |
| y = -2 | R = -2.00<br>G = -0.73<br>B = 2.73 | R = -1.00<br>G = -1.23<br>B = 2.23 | R = 0.00<br>G = -1.73<br>B = 1.73 | R = 1.00<br>G = -2.23<br>B = 1.23 | R = 2.00<br>G = -2.73<br>B = 0.73 |

*FIG. 7*

SELECTING A CALIBRATION FUNCTION FOR A DIGITAL PRINTER WHICH MINIMIZES AN ERROR CRITERION

CROSS REFERENCE TO RELATED APPLICATION

Reference is made to and priority claimed from U.S. Provisional Application Serial No. U.S. 60/000,294, filed Jun. 19, 1995, entitled METHOD AND APPARATUS FOR PRINTER CALIBRATION and a Continuation of application Ser. No. 08/602,401, filed Feb. 16, 1996 now abandoned.

FIELD OF THE INVENTION

This invention pertains to the field of digital image processing, and more particularly to the field of calibrating digital printing devices.

BACKGROUND OF THE INVENTION

A key component in many digital imaging systems is a digital printer. A digital printer produces hard copy output from a digital representation of an image. Digital printers have been made using many different basic technologies such as thermal dye diffusion, electrophotography, ink-jet, and digital silver halide writers. Such printers can either be monochrome (usually "black-and-white"), or may print multiple colors (typically cyan, magenta, and yellow). The input signal to a digital printer is a digitally encoded representation of the desired image. Typically, this includes of a multilevel representation of the desired image density for each color plane at each x-y location (pixel) in the image. Alternatively, the information (such as a PostScript file) necessary to create such a representation can be supplied as input to the printer. Typically, each pixel may be characterized by an 8-bit digital value for each color plane in the image. This provides $2^8=256$ possible density levels for the digital printer to reproduce.

A digital printer will typically respond to some fundamental control parameter. This control parameter will vary depending on the particular output technology. For example, thermal dye diffusion printers typically respond to the number of heat pulses applied by a heater element for a given pixel, and silver halide printers typically respond to the digitally controlled intensity of a laser spot. The value of the control parameter will be referred to as the printer control signal. It is possible to measure the image density formed on a digital printer as a function of the value of the printer control signal. For example the optical density of the image as a function of the number of thermal pulses can be measured for a thermal dye diffusion printer. This relationship between the physical output response of the digital printer and the printer control signal will be referred to as the "raw sensitometry" of the digital printer.

Usually the raw sensitometry for a digital printer does not correspond to the desired output density as a function of the input signal to the digital printer. As a result it is frequently necessary to apply a "printer calibration function" to convert the input signal to the appropriate printer control signal. For example, the printer calibration function may convert an 8-bit input signal into the number of thermal pulses necessary to produce the desired output density for each value of the input signal. This is illustrated in FIG. 1 which shows a digital printer 10 responding to an input signal I(x,y) for each x, y pixel of the image. A calibration function 12 is applied to the input signal I(x,y) to produce a printer control signal P(x,y). Often the calibration function may be incorporated into the digital printer itself so that it is not apparent as a separate component to the user as is shown in FIG. 2. In this case, the digital printer 20 includes a digital print engine 22 as well as a printer calibration function 24. For a digital color printer, there will usually be three or four input color channels. Each color channel will typically have it's own calibration function. FIG. 3 shows a three color printer 30 having red, green, and blue input signals given by $I_R(x,y)$, $I_G(x,y)$, and $I_B(x,y)$, respectively. The calibration function for a red color channel 34 processes the red input signal $I_R(x,y)$ to form a red printer control signal $P_R(x,y)$. Likewise, the calibration functions for the other two channels (36 and 38) are used to process the corresponding input signals. The printer control signals are then used to drive a digital print engine 32.

Fundamental to being able to determine a printer calibration function is the accurate knowledge of the digital printer's raw sensitometry. As a result, printer manufacturers will typically go to great lengths to characterize and control the raw sensitometry of the digital printer as closely as possible in the manufacturing process. In many cases, however, the raw sensitometry of a printer will vary over time due to factors such as media variability, aging of the digital printer's components, and changes in the digital printer's environment. If the printer calibration function is not modified accordingly, the output density formed by the printer will also vary over time. This can manifest itself as a change in the overall density of the image, or in the case of a color printer, as a change in the color-balance of the image. This last effect can be particularly objectionable due to the fact that color balance errors are more easily perceived by a human observer than density errors. As a result it is frequently desirable to be able to measure the raw sensitometry of a printer in the field so that an updated calibration table can be determined and used in the printer.

A number of prior art methods of determining the raw sensitometry for a digital printer involve printing a calibration target having patches created using a series of different printer control signal values (see U.S. Pat. No. 5,053,866). The raw sensitometry can then be determined by measuring the output density (or some other output quantity) using a densitometer (or some other measurement instrument). Typically it is not necessary or desirable to measure the output density for every possible value of the printer control signal. More often, some subset of the printer control signals are used, and the raw sensitometry values for the remaining printer control signals can be estimated using interpolation and smoothing methods. One problem with this method however is that the measured raw sensitometry function is quite susceptible to errors introduced by measurement noise, density variability (both within a print, as well as print-to-print), and image artifacts. As a result, the resulting printer calibration table determined from the raw sensitometry will contain errors as well. These errors can be particularly objectionable for color printers because of the fact that errors in determining the raw sensitometry in one color plane can result in color balance errors which vary across the tone scale. For example, if you were to print a smooth neutral gradient spanning the range from black to white, some portions of the gradient might appear to have a greenish cast, while others might appear to have a reddish cast. This will be quite objectionable to a human observer.

Typically errors in the raw sensitometry measurements can be minimized by performing many replications of the measurements, and subsequently applying statistical techniques to eliminate bad data points, and average out the measurement errors. Although this is useful in the determination of the calibration function during the printer manufacturing process, it is frequently not convenient to do this when updating the printer calibration in the field where it is desired to make the fewest number of prints and measurements, and to complete the calibration procedure in the shortest possible time.

A number of techniques have recently been disclosed (see U.S. Pat. Nos. 5,298,993 and 5,347,369) which teach the use of calibration targets that can be "measured" using only a human observer. These techniques, which will be referred to as "visual calibration techniques," also tend to be susceptible to noise in the visual judgement process. In fact, since the measurement variability tends to be larger in many cases, the errors can actually be substantially larger than those associated with instrumented measurements.

SUMMARY OF THE INVENTION

It is an object of this invention to provide method and apparatus for measuring the raw sensitometry of a digital printer which is less susceptible to measurement error than the prior art methods discussed above.

This object is achieved in a method for calibrating a digital printer to provide a substantially aim printer response, comprising the steps of:

a) processing a test target through a set of potential calibration functions to form a set of processed test targets;

b) printing the set of processed test targets using the digital printer;

c) measuring the set of printed test targets to determine the printer response;

d) comparing the measured printer response for each of the set of potential calibration functions to the aim printer response to determine an error criterion; and e) selecting the calibration function which has the smallest value of the error criterion.

ADVANTAGES

The present invention has the advantage that it is less sensitive to noise and measurement error than other instrumented techniques for determining the calibration function for a digital printer.

The present invention has the advantage over visual calibration techniques that it is insensitive to viewing conditions and observer variability.

It has the additional advantage that it can be automated for easy calibration of digital printers.

BRIEF DESCRIPTION OF THE DRAWINGS

FIG. 7 depicts a sample set of speed shift values;

DETAILED DESCRIPTION OF THE INVENTION

In the above referenced, commonly assigned U.S. Provisional Patent Application Serial No. 60/000,294 filed concurrently herewith, there is described a new visual calibration technique for color printers that does not rely on the observer to make judgments at a series of different output density levels to construct the printer's raw sensitometry function. Instead, the existing smooth raw sensitometry function that was determined in the factory is perturbed by various amounts to form a set of candidate raw sensitometry functions. A target containing one or more gray levels is then processed using each of the candidate raw sensitometry functions, and an image is printed with a composite of the targets. An observer will then evaluate the targets to select the one that has the most acceptable tone response and color-balance. This method has the advantage that any observer judgment errors do not create local errors in the raw sensitometry function that can result in the particularly objectionable variations in the color balance as a function of density level.

In some cases, however, it is not desirable to rely on the judgments of a human observer. This is due to several reasons. First, the quality of the results may depend on the experience level of the individual making the judgments. Second, the results may also depend on the viewing conditions under which the visual judgment is made. As a result, when it is desired to get repeatable raw sensitometry estimates using untrained operators it is desirable to be able to use some form of instrumented calibration method. The present invention represents a solution which combines the advantages of the visual calibration technique disclosed in U.S. Provisional Patent Application Serial No. 60/000,294 with the advantages of the instrumented calibration techniques.

Figure 1:
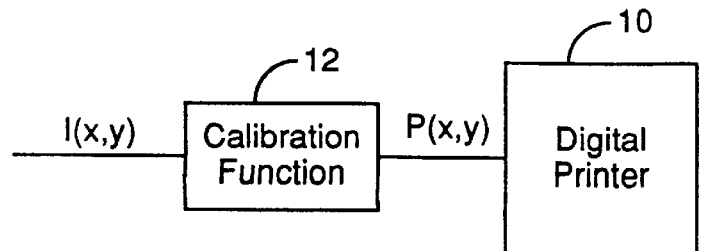
FIG. 1 shows a prior art printer calibration arrangement.
Figure 2:
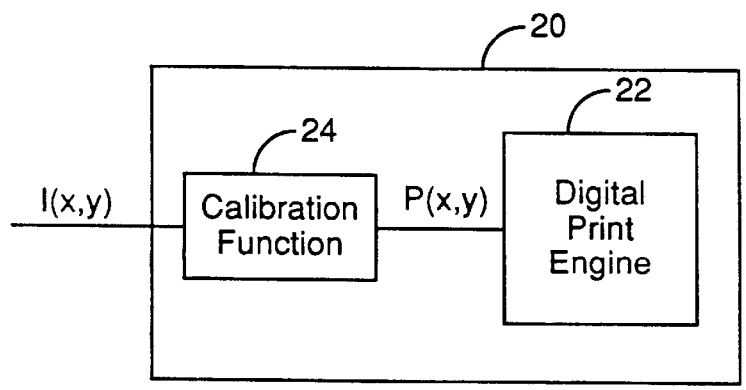
FIG. 2 shows a prior art printer calibration arrangement where the calibration function is integrated into a digital printer.
Figure 3:
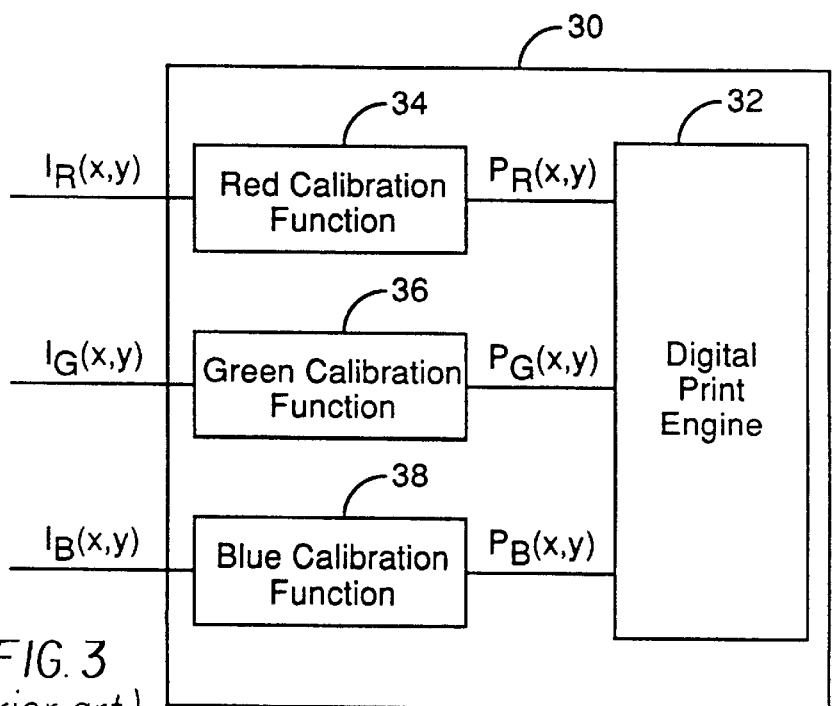
FIG. 3 shows a prior art printer calibration arrangement for a color printer.
Figure 4:
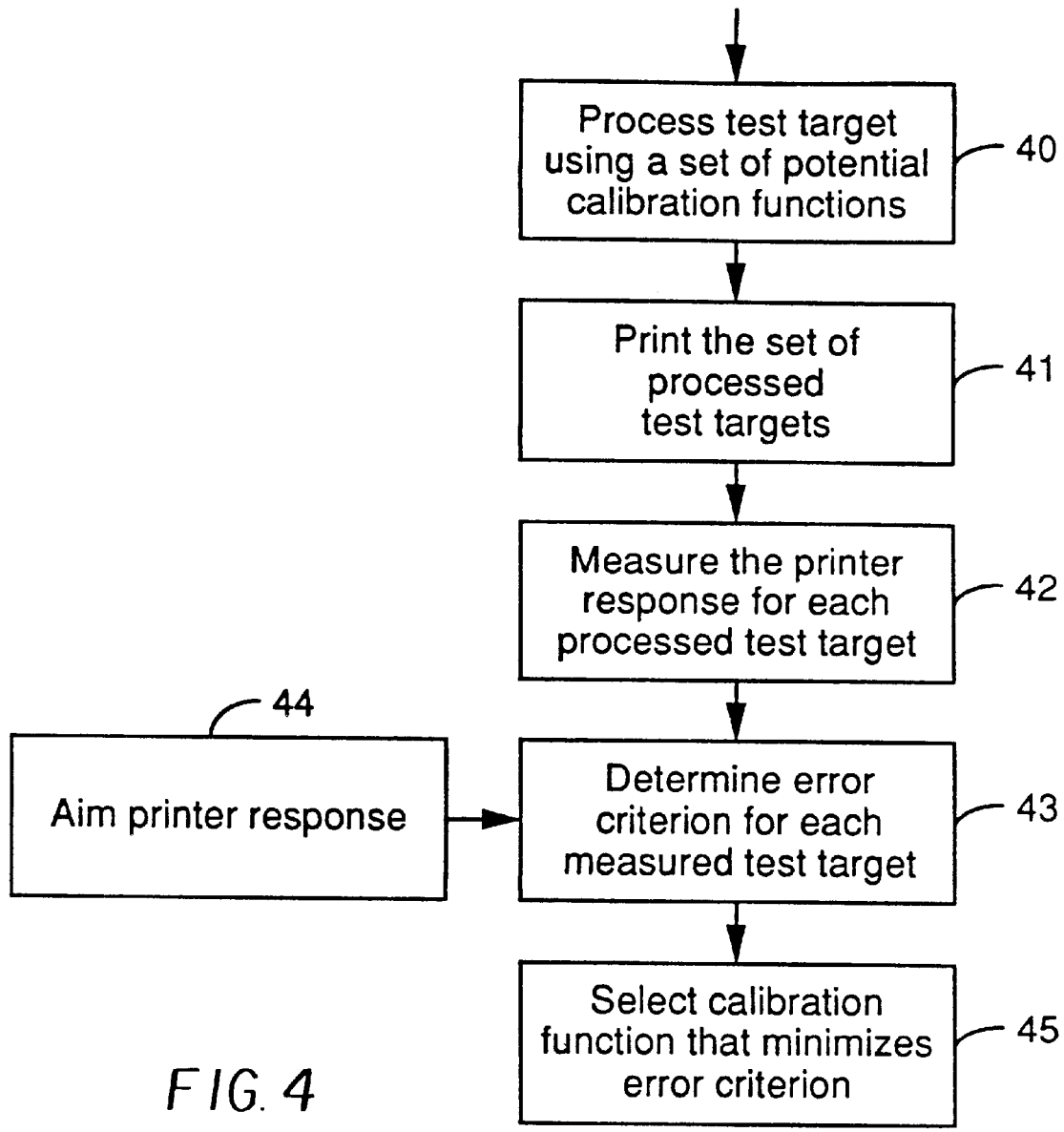
FIG. 4 is a logic diagram showing a method according to the present invention.

Turning to FIG. 4, a flow chart is shown describing the basic steps of the present invention. In the first step 40, a test target is processed using a set of potential calibration functions. The next step 41 includes printing the set of processed test targets. The set of printed test targets are then measured in step 42 to determine the printer response for each of the potential calibration functions. The printer response for each of the potential calibration functions is then compared to an aim printer response 44, and an error criterion is determined in step 43. The potential calibration function having the smallest error criterion value is then selected in step 45 to be used as the printer calibration function for future prints.

Figure 9:
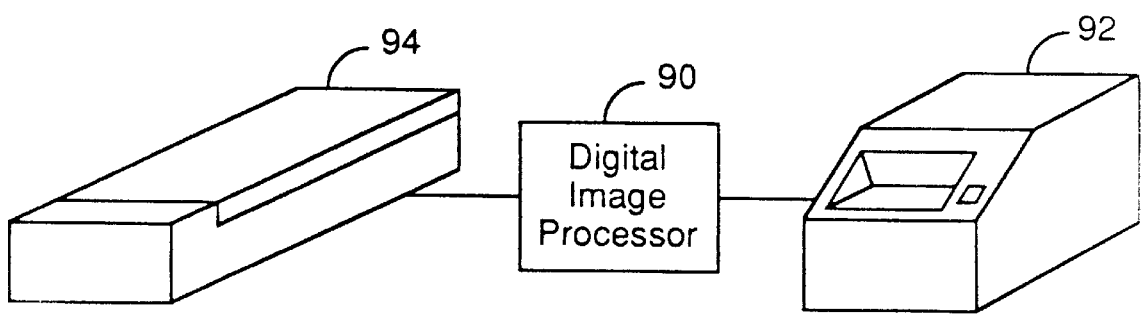
FIG. 9 depicts a digital imaging system used to implement the method of the present invention.

In an embodiment of the present invention the calibration process is accomplished using a closed digital imaging system. An example of such a system is shown in FIGS. 4 and 9. In this case, a digital image processor 90 is connected to a digital printer 92 and an image scanner 94. In such a closed system, the digital image processor 90 is adapted to carry out step 40 of processing the test target through the set of potential calibration functions. Such digital image processors are understood and well known in the art. The digital printer 92 is then used to carry out step 41 of printing the processed test targets. The image scanner 94 is used for step 42 to measure the printer response for the set of printed test targets. Thereafter, the digital image processor 90 is used to compare the measured printer response for each of the set of potential calibration functions to an aim printer response 44 and step 43 to determine an error criterion for each measured test target. The digital image processor 90 is then used to carry out step 45 of selecting the calibration function that has the smallest value of the error criterion. Although the image scanner 94 shown in FIG. 9 is one common type of input device, it can be seen that this system can easily be generalized to include other measuring devices such as densitometers, colorimeters, and spectrophotometers.

Figure 5:
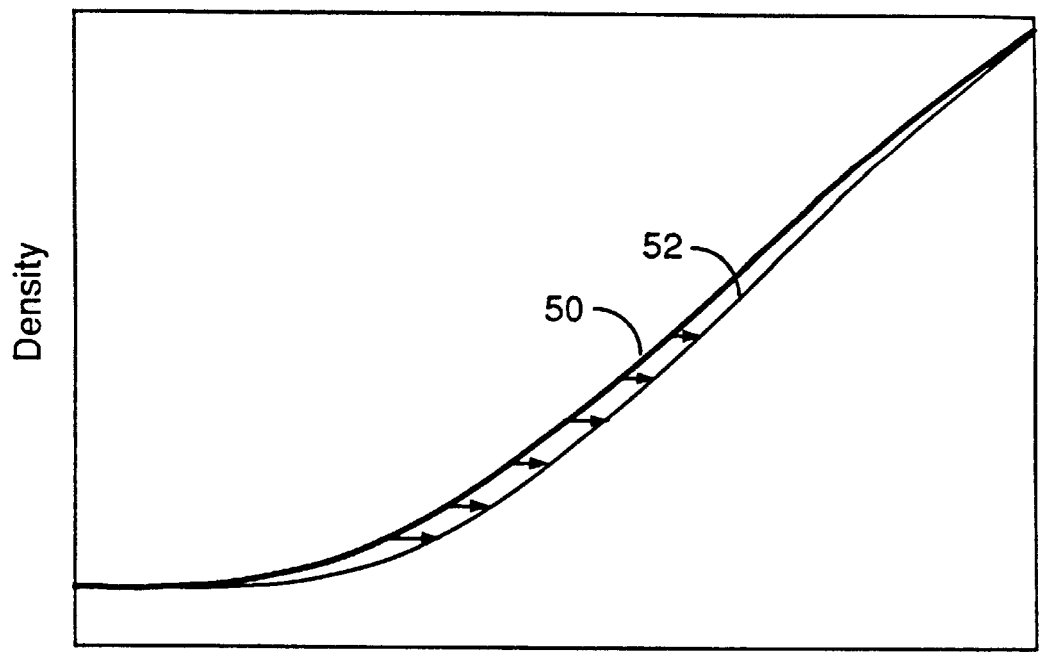
FIG. 5 depicts an example of a speed shifted raw sensitometry function.
Figure 6:
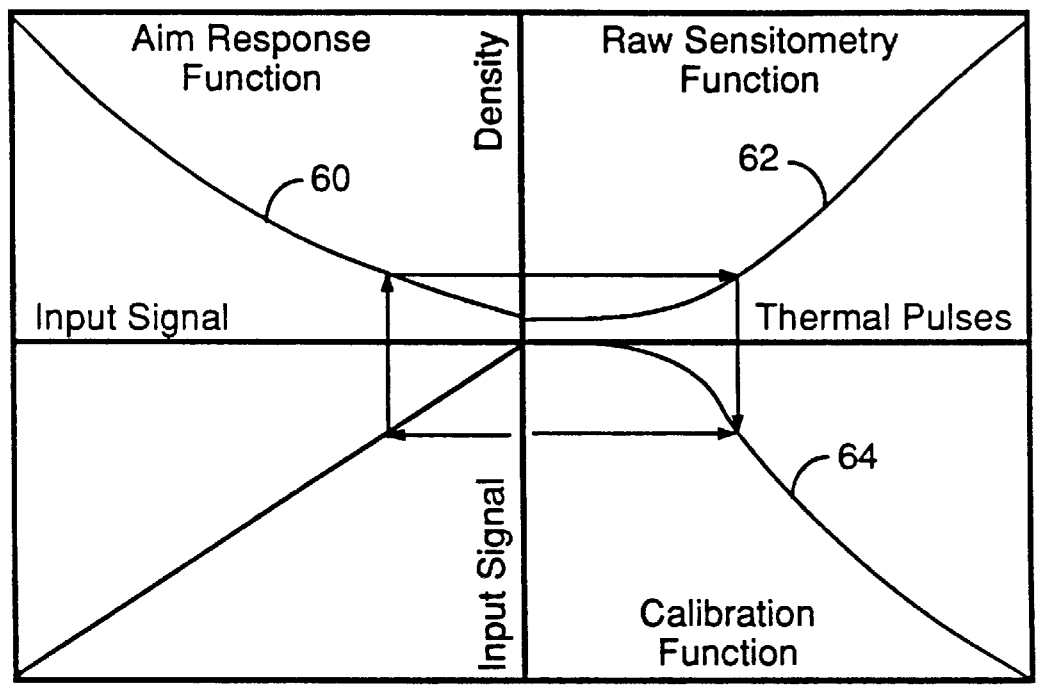
FIG. 6 illustrates a process for forming a calibration function from a raw sensitometry function and a aim printer response function.

The set of potential calibration functions used in step 40 may be a set of predetermined calibration functions representing known or likely variations in the printer calibration. Great care can be taken in the design of the predetermined calibration functions to ensure that they are smooth so that there will be a minimal opportunity for the introduction of artifacts such as contouring and local color balance variations. Alternatively, the set of potential calibration functions may be determined by applying modifications to a standard calibration function. For example, in the case of a thermal dye diffusion printer it has been found that the variations in the printer calibration table can typically be approximated by applying a density dependent shift to a standard raw sensitometry function. The density dependent shift of the standard raw sensitometry function will be referred to as a "speed shift." FIG. 5 illustrates a typical standard raw sensitometry function 50, and a speed shifted raw sensitometry function 52. The difference between the two raw sensitometry functions can be adjusted by applying shifts of different magnitudes. Frequently, a single number can be used to represent the magnitude of the shift, although a weighting function may be used to vary the amount of shift applied as a function of density. The corresponding calibration function can be found by combining the speed shifted raw sensitometry with a aim printer response function 60 as shown in FIG. 6. By the term "aim printer response" is meant the desired printer response. For each input signal value, the desired output response (density in this example) is determined using the aim printer response function 60. The corresponding printer control signal (thermal pulses in this example) necessary to produce the desired output response is then determined using the raw sensitometry function 62. This composite function relating the input signal value to the printer control signal is the calibration function 64.

For a color printer, modifications to the calibration functions for each of the color channels can be made independently. Many times, the most important reason to recalibrate a printer is because of perceived color balance errors, rather than absolute density errors. In this case, the absolute response of any one color channel is less important than the relative response between the color channels. Therefore it is convenient to form a set of potential calibration functions which span the range of possible color balance variations. The speed shift technique is particularly convenient for forming such a set of potential calibration functions. For example, a set of calibration functions that are determined using speed shifted raw sensitometry functions using red, green and blue speed shifts given by R, G, and B, respectively, using the following equations:

$$R = k\, r \cos(\theta) \tag{1a}$$

$$G = -k\, r \cos(\theta + \pi/3) \tag{1b}$$

$$B = -k\, r \cos(\theta - \pi/3) \tag{1c}$$

where $$r = (x^2 + y^2)^{1/2} \tag{2a}$$

$$\theta = \tan^{-1}(y/x) \tag{2b}$$

FIG. 7 shows a set of speed shift values which were determined using Eqs. (1) and (2) while x and y were varied between −2 and +2. The value of k in this case was taken to be 1.0. FIG. 7 reveals that the magnitude of the color balance shift grows with r (the distance from the center point where x=y=0), and that the hue of the color balance shift varies with θ (the angle relative to the center point). It can be seen that such a set of potential calibration functions can be used to compensate for global color balance variations of different magnitudes and hues.

Once the set of potential calibration functions has been defined, it is then necessary to process a test target using each of the potential calibration functions as shown in step 40 of FIG. 4. In the preferred embodiment of this invention the test target will include one or more neutral patches having different density levels. Alternatively, color patches, or a combination of neutral and color patches could also be used. It is generally desirable to choose the patch values to be in regions of the tone scale which are most sensitive to the changes in the printer's response. The test targets can either be processed using the actual set of potential calibration functions and then printed using a null calibration function, or a set of equivalent calibration functions can be determined which would be equivalent to the desired set of potential calibration functions when cascaded with the current printer calibration function.

Figure 8:
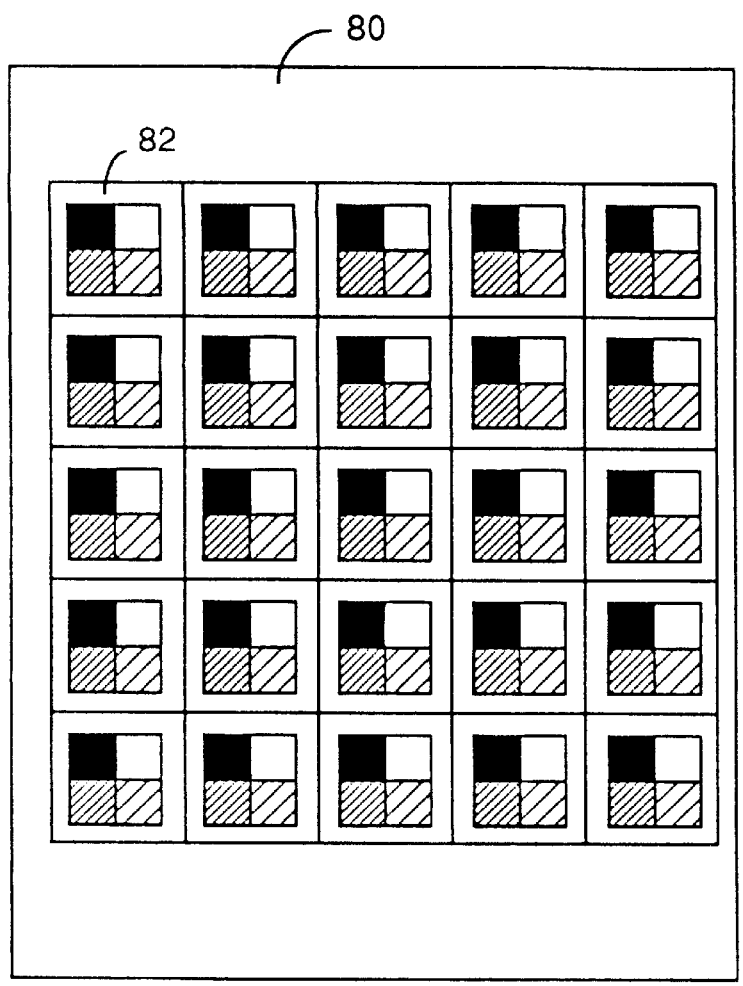
FIG. 8 depicts an image containing a set of test targets.

The next step is to print the processed test targets on the digital printer as shown in step 41 of FIG. 4. Each test target can be individually printed, or more conveniently, one or more composite images can be formed containing the set of processed test targets. FIG. 8 illustrates a composite image 80 that can be formed to print test targets processed using the set of speed shifts shown in FIG. 7. Each test target 82 corresponds to one of the potential calibration functions determined from the set of speed shift values. In this case it is convenient to arrange the test targets in rows and columns corresponding to the rows and columns of the array shown in FIG. 7, but this is by no means necessary. If the test targets were processed with the actual set of calibration functions, it is necessary to use a null printer calibration function, or bypass the printer calibration function altogether, during the printing process as was discussed above.

Once the processed test targets have been printed, it is then necessary to measure the printer response corresponding to each of the potential calibration functions as shown in step 42 of FIG. 4. There are many different ways that the targets can be measured. For example, a hand-held densitometer or a scanning densitometer could be used. Alternatively, a calorimeter or a spectrophotometer could be used. One device which is frequently convenient to use is an image scanner. Many digital imaging systems that have a digital printer 92 also have an image scanner 94 as well as a digital image processor 90 as shown in FIG. 9. Many different types of image scanners can be used such as flatbed scanners, drum scanners, and hand-held scanners. The fundamental printer response value which is measured will be a function of the particular measurement device which is being used. For example, if a densitometer is used, density values will generally be measured. On the other hand, if a colorimeter or a spectrophotometer is used, device independent color values such as the well-known CIE XYZ tristimulus values or CIELAB values will generally be measured. If a scanner is being used, scanner code values will generally be the measured quantity. The actual scanner code values will be a function of the type of scanner, and the scanner settings.

After the printer response has been measured for each of the set of test targets corresponding to each of the potential calibration functions, the next step is to determine an error criterion by comparing each of the measured printer response values to aim printer response values 44 corresponding to those that would be produced by a properly calibrated printer. This is shown as step 43 of FIG. 4. In many cases, the aim printer response will correspond to a factory determined aim calibration. In other cases, it is desirable to allow an advanced user to specify a custom aim printer response for his specific tone reproduction and color balance preferences. For example, the user might prefer that neutral colors be reproduced with a "colder" color balance (i.e., more of a bluish color cast) than the factory determined aim calibration.

It is important that the aim printer response values are determined appropriately given the specific type of measurement device. One convenient method for accomplishing this is to measure a test target produced on an ideally calibrated printer using the same measurement procedure that is used for the processed test targets. The comparison between the measured printer response values, and the aim printer response values can either be made directly in the measurement space of the particular measurement device, or the measured response values can be transformed to some other space before comparing with the aim response values. For example, scanner code values can be transformed into CIELAB color values for comparison with aim CIELAB color values. This transformation could be made using a set of defined mathematical relationships, or using a look-up table (LUT) populated using experimental measurements.

Many different error criterions could be used to characterize the difference between the measured printer response values and the aim printer response values. In one embodiment of this invention, the error criterion is given by $$C = \sum_{patches} W_{patch} (\Delta R_{patch})^2 \qquad (3)$$

where C is the value of the error criterion, $W_{patch}$ is a weighting factor determined by the relative importance of each patch, and $\Delta R_{patch}$ is a measure of the error in the response value for each patch. In one preferred embodiment of this invention, $\Delta R_{patch}$ is given by $\Delta E$, which is the distance between the aim printer response and the measured printer response in a uniform color space such as CIELAB.

In another embodiment of this invention that is useful for color printers, a variation of the $\Delta E$ value which neglects errors in lightness is used:

$$\Delta R_{patch} = \Delta E_{ab} \sqrt{(a^*_{aim} - a^*_{patch})^2 + (b^*_{aim} - b^*_{patch})^2} . \qquad (4)$$

wherein $a^*_{aim}$ and $b^*_{aim}$ are CIELAB color values for the aim printer response, and $a^*_{patch}$ and $b^*_{patch}$ are CIELAB color values for the measured printer response.
This form of the error criterion emphasizes color balance errors, and ignores lightness errors.

For black-and-white printers, it is not necessary to use an error criterion which relates to color errors. In this case the value of $\Delta R_{patch}$ can be given simply by the density error with each patch, or more preferably, by the lightness error associated with each patch $$\Delta R_{patch} = \Delta L^* = |L^*_{aim} - L^*_{patch}|. \qquad (5)$$

wherein $L^*_{aim}$ is the lightness associated with the aim printer response, and $L^*_{patch}$ is the lightness associated with the measured printer response.

The next step is to select the calibration function that minimizes the value of error criterion as shown in step 45 of FIG. 4. This can be accomplished by comparing the values of the error criterion determined for each of the potential calibration functions and selecting the calibration function giving the smallest value of the error criterion. The selected calibration function can then be used with the printer until the next time the printer is calibrated. Depending on the architecture of the particular printer, it may be desirable and/or necessary to store the selected calibration function in a digital memory associated with the printer. In some cases, it may be desirable to store the calibration function on a host computer where it can be used to process image data being prepared for the printer, or downloaded with each job sent to the printer.

In some cases where the set of potential calibration functions vary in a systematic way, it may be possible to further refine the estimate of the proper calibration function. For example, consider the case where the speed shift technique is used to determine the set of potential calibration functions as was discussed above with reference to FIGS. 5–7. If the measured printer response shows that one target has a greenish cast, and the adjoining target corresponding to the next speed shift increment has a magenta cast, then it is apparent that the appropriate value of the speed shift is between the two speed shift values used to process these targets. Based on this evaluation it is possible to perform a second iteration of the calibration procedure using finer speed shift increments to obtain a better estimate of the optimum speed shift value. Alternatively, it is also possible to interpolate between the measured printer response values to estimate the optimum speed shift. For example, if it were determined that the aim printer response value was one third of the way between two measured printer response values, it can be inferred that the optimum speed shift would be one third of the way between the corresponding speed shift values. The interpolation approach has the advantage that it is not necessary to print and measure another image, and additionally that finer levels of correction are possible.

In many digital printing systems, there may be a substantial amount of page-to-page and within-page variation in the raw sensitometry function. Potentially, this can result in misleading estimates of the measured raw sensitometry function depending on the particular locations that the test targets corresponding to the set of potential calibration functions are printed. One way to minimize these effects is to print the processed test targets multiple times in a variety of locations, or on a number of different pages. The printer response for each of the multiple printed test targets for each of the potential calibration functions can then be measured and combined to determine an average measured printer response. The average measured printer response for each of the potential calibration functions can then be used to determine the value of the error criterion. This should provide a better overall estimate of the average printer response.

The invention has been described in detail with particular reference to certain preferred embodiments thereof, but it will be understood that variations and modifications can be effected within the spirit and scope of the invention.

Parts List 10 digital printer
12 calibration function
20 digital printer
22 digital print engine
24 calibration function 30 three color printer
32 digital print engine
34 red calibration function
36 green calibration function
38 blue calibration function
40 test target processing step
41 test target printing step
42 test target measuring step
43 error criterion determining step
44 aim printer response
45 calibration function selection step
50 standard raw sensitometry function
52 speed shifted raw sensitometry function
60 aim printer response function
62 raw sensitometry function
64 calibration function
80 composite image
82 test target
90 digital image processor
92 digital printer
94 image scanner

What is claimed is:

1. A method for selecting a calibration function for a digital printer which minimizes an error criterion relative to an aim printer response, comprising the steps of:

a) processing a test target through a set of potential calibration functions to form a set of corresponding processed test targets that correspond to the potential calibration functions;

b) printing a complete set of corresponding printed test targets using the digital printer that correspond to the set of processed test targets;

c) measuring with a device the complete set of corresponding printed test targets to determine the printer response for each of the printed test targets;

d) comparing the measured printer response for each of the printed test targets to the aim printer response by calculating an error criterion; and e) selecting the calibration function that corresponds to one printed test target of the complete set of corresponding printed test targets that has the smallest value of the calculated error criterion.

2. The method of claim 1 wherein the test target includes one or more neutral patches.

3. The method of claim 1 wherein the set of processed test targets are printed as a composite image.

4. The method of claim 1 wherein the set of potential calibration functions are formed by applying modifications to a standard calibration function.

5. The method of claim 4 wherein the modifications to the standard calibration function are obtained by applying speed shifts to a standard raw sensitometry function.

6. The method of claim 2 wherein the printer response is measured by using a densitometer to measure the neutral patch density values.

7. The method of claim 6 wherein the error criterion is determined from the differences between the measured neutral patch density values and aim neutral patch density values for the neutral patches.

8. The method of claim 2 wherein the printer response is measured by using a scanner to measure the neutral patch values.

9. The method of claim 8 wherein the error criterion is determined from the differences between the measured neutral patch values and aim neutral patch values for the neutral patches.

10. The method of claim 8 wherein the measured printer response for the neutral patches is used to estimate color values in a uniform color space.

11. The method of claim 10 wherein the error criterion is determined from the differences between the measured neutral patch color values and aim neutral patch color values for the neutral patches.

12. The method of claim 2 wherein the printer response is measured by using a colorimeter to measure the neutral patch color values.

13. The method of claim 12 wherein the error criterion is determined from the differences between the measured neutral patch color values and aim neutral patch color values for the neutral patches.

14. The method of claim 2 wherein the printer response is measured by using a spectrophotometer to measure the neutral patch color values.

15. The method of claim 14 wherein the error criterion is determined from the differences between the measured neutral patch color values and aim neutral patch color values for the neutral patches.

16. The method of claim 1 wherein the aim printer response is specified by the user.

17. The method of claim 1 further including the step of loading the selected calibration function into the printer's memory.

18. The method of claim 7 wherein the error criterion is given by:

$$C = \sum_{patches} W_{patch}(\Delta R_{patch})^2$$

where C is the value of the error criterion, $W_{patch}$ is a weighting factor determined by the relative importance of each patch, and $\Delta R_{patch}$ is the difference between the measured neutral patch density value and the aim neutral patch density value for each patch.

19. The method of claim 9 wherein the error criterion is given by:

$$C = \sum_{patches} W_{patch}(\Delta R_{patch})^2$$

where C is the value of the error criterion, $W_{patch}$ is a weighting factor determined by the relative importance of each patch, and $\Delta R_{patch}$ is the difference between the measured neutral patch value and the aim neutral patch value for each patch.

20. The method of claim 11 wherein the error criterion is given by:

$$C = \sum_{patches} W_{patch}(\Delta R_{patch})^2$$

where C is the value of the error criterion, $W_{patch}$ is a weighting factor determined by the relative importance of each patch, and $\Delta R_{patch}$ is the difference between the measured neutral patch color value and the aim neutral patch color value for each patch.

21. The method of claim 20 wherein the difference between the measured neutral patch color value and the aim neutral patch color value for each patch is given by $$\Delta R_{patch} = \Delta E_{ab} \sqrt{(a^*_{aim} - a^*_{patch})^2 + (b^*_{aim} - b^*_{patch})^2}$$

wherein $a^*_{aim}$ and $b^*_{aim}$ are CIELAB color values for the aim printer response, and $a^*_{patch}$ and $b^*_{patch}$ are CIELAB color values for the measured printer response.

22. A method for selecting a calibration function for a digital printer which minimizes an error criterion relative to an aim printer response, comprising the steps of:
   a) processing a test target through a set of potential calibration functions to form a set of corresponding processed test targets that correspond to the potential calibration functions;
   b) printing multiple copies of a complete set of corresponding printed targets using the digital printer that correspond to the processed test targets;
   c) measuring with a device printer responses for the multiple copies of the complete set of corresponding printed test targets;
   d) combining the measured printer responses for the multiple copies of the complete set of corresponding printed test targets to form a set of corresponding average measured printer responses;
   e) comparing the average measured printer response for each of the complete set of corresponding average measured printer responses to the aim printer response by calculating an error criterion; and
   f) selecting the calibration function which corresponds to one average measured printer response of the complete set of average measured printer responses that has the smallest value of the calculated error criterion.

23. A method for determining a calibration function for a digital printer which minimizes an error criterion relative to an aim printer response, comprising the steps of:
   a) forming a set of potential calibration functions by applying modifications to a standard calibration function;
   b) processing a test target through a complete set of potential calibration functions to form a set of corresponding processed test targets that correspond to the potential calibration functions;
   c) printing the complete set of processed test targets using the digital printer to generate a complete set of corresponding printed test targets;
   d) measuring with a device the complete set of corresponding printed test targets to determine the printer response;
   e) comparing the measured printer response for each of the complete set of corresponding printed test targets to the aim printer response by calculating an error criterion;
   f) interpolating between the modifications applied to the standard calibration function to determine a modification which minimizes the error criterion; and
   g) determining a new calibration function by applying the interpolated modification to the standard calibration function.

24. The method of claim 23 wherein the modifications to the standard calibration function are obtained by applying speed shifts to a standard raw sensitometry function.

25. A method for determining a calibration function for a digital printer which minimizes an error criterion relative to an aim printer response, comprising the steps of:
   a) forming a set of potential calibration functions by applying modifications to a standard calibration function;
   b) processing a test target through a complete set of potential calibration functions to form a set of corresponding processed test targets that correspond to the potential calibration;
   c) printing multiple copies of the complete set of processed test targets using the digital printer to generate multiple copies of a complete set of printed test targets;
   d) measuring with a device printer responses for the multiple copies of the complete set of corresponding printed test targets;
   e) combining the corresponding measured printer responses for the multiple copies of the complete set of corresponding printed test targets to form a set of corresponding average measured printer responses;
   f) comparing the average measured printer response for each of the complete set of corresponding printed test targets to the aim printer response by calculating an error criterion;
   g) interpolating between the modifications applied to the standard calibration function to determine a modification which minimizes the calculated error criterion; and
   h) determining a new calibration function by applying the interpolated modification to the standard calibration function.

26. The method of claim 25 wherein the modifications to the standard calibration function are obtained by applying speed shifts to a standard raw sensitometry function.

27. An apparatus for selecting a calibration function for a digital printer which minimizes an error criterion relative to an aim printer response, comprising:
   a) means for processing a test target through a set of potential calibration functions to form a set of corresponding processed test targets that correspond to the potential calibration functions;
   b) a digital printer for printing the complete set of processed test targets to generate a complete set of corresponding printed test targets;
   c) a device for measuring the complete set of corresponding printed test targets to determine a printer response for each of the printed test targets;
   d) means for comparing the measured printer response for each of the printed test targets to the aim printer response by calculating an error criterion; and
   e) means for selecting the calibration function corresponding to one printed test target of the set of corresponding printed test targets that has the smallest value of the calculated error criterion to calibrate the digital printer.

28. An apparatus for determining a calibration function for a digital printer which minimizes an error criterion relative to an aim printer response, comprising:
   a) means for forming a set of potential calibration functions by applying modifications to a standard calibration function;
   b) means for processing a test target through a set of potential calibration functions to form a set of corresponding processed test targets that correspond to the potential calibration functions;
   c) a digital printer for printing a complete set of processed test targets to generate a complete set of corresponding printed test targets;
   d) a device for measuring the complete set of corresponding printed test targets to determine a printer response for each of the printed test targets;

e) means for comparing the measured printer response for each of the printed test targets to the aim printer response by calculating an error criterion;

f) means for interpolating between the modifications applied to the standard calibration function to determine a modification which minimizes the calculated error criterion; and g) means for determining a new calibration function by applying the interpolated modification to the standard calibration function.

29. A method for calibrating a digital printer to provide a substantially aim printer response, comprising the steps of:

a) processing a test target through a set of potential calibration functions that are formed by applying modifications to a standard calibration function and wherein the modifications are obtained by applying speed shifts to a standard raw sensitometry function to form a set of processed test targets;

b) printing the set of processed test targets using the digital printer;

c) measuring the set of printed test targets to determine the printer response;

d) comparing the measured printer response for each of the set of potential calibration functions to the aim printer response to determine an error criterion; and e) selecting the calibration function which has the smallest value of the error criterion.

30. A method for calibrating a digital printer to provide a substantially aim printer response, comprising the steps of:

a) forming a set of potential calibration functions by applying modifications to a standard calibration function, wherein the modifications are obtained by applying speed shifts to a standard raw sensitometry function;

b) processing a test target through the set of potential calibration functions to form a set of processed test targets;

c) printing the set of processed test targets using the digital printer;

d) measuring the set of printed test targets to determine the printer response;

e) comparing the measured printer response for each of the set of potential calibration functions to the aim printer response to determine an error criterion;

f) interpolating between the modifications applied to the standard calibration function to determine a modification which minimizes the error criterion; and g) determining a new calibration function by applying the interpolated modification to the standard calibration function.

31. A method for calibrating a digital printer to provide a substantially aim printer response, comprising the steps of:

a) forming a set of potential calibration functions by applying modifications to a standard calibration function, wherein the modifications are obtained by applying speed shifts to a standard raw sensitometry function;

b) processing a test target through the set of potential calibration functions to form a set of processed test targets;

c) printing multiple copies of the set of processed test targets using the digital printer;

d) measuring printer responses for the multiple copies of the printed test targets to form a set of average measured printer responses;

e) combining the measured printer responses for the multiple copies of the printed test targets to form a set of average measured printer responses;

f) comparing the average measured printer response for each of the set of potential calibration functions to the aim printer response to determine an error criterion;

g) interpolating between the modifications applied to the standard calibration function to determine a modification which minimizes the error criterion; and h) determining a new calibration function by applying the interpolated modification to the standard calibration function.

* * * * *